March 31, 1942.  M. A. HOLLENGREEN ET AL  2,278,264

SPINDLE BEARINGS

Filed Jan. 25, 1939

Inventors
MILBURN A. HOLLENGREEN
CHARLES R. MENTZER
By
Attorney

Patented Mar. 31, 1942

2,278,264

UNITED STATES PATENT OFFICE 2,278,264

SPINDLE BEARING

Milburn A. Hollengreen and Charles R. Mentzer, Waynesboro, Pa., assignors to Landis Tool Company, Waynesboro, Pa.

Application January 25, 1939, Serial No. 252,813

4 Claims. (Cl. 82—30)

Our invention relates to headstocks for machine tools and particularly to that type of headstock having provision for either live or dead spindle operation.

An object of our invention is to provide a bearing arrangement for a headstock spindle whereby to reduce to a minimum the overhang at the front end of the spindle.

A further object is to provide antifriction bearings for the pulley.

A further object is to provide a common means for supporting said spindle bearings and said pulley bearings.

A further object is to provide means for sealing the space between the face plate and the spindle.

A further object is to provide means for locating the face plate latch quickly in operative position.

Figures 1, 2:
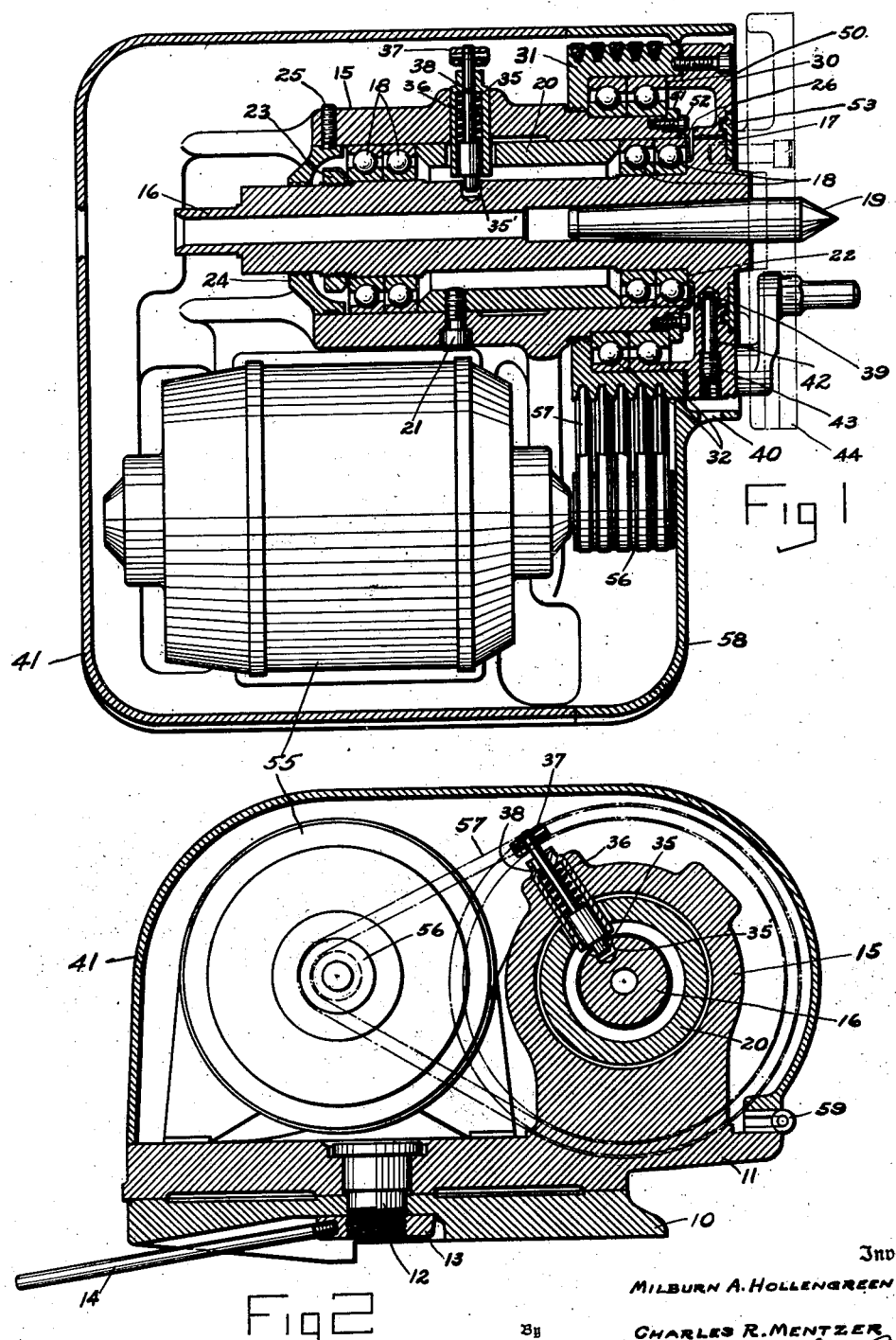
Figure 1 is a sectional plan view of a machine tool headstock.
Figure 2 is a sectional end elevation.

In the drawing, numeral 10 indicates an intermediate support member. A headstock base member 11 is secured to said intermediate member by means of a clamping stud 12 and nut 13. A rod 14 extends beyond said intermediate member and has one end threaded into the side of nut 13. Said rod serves as a handle to loosen said nut whenever it is desired to adjust said base 11 angularly on said intermediate member 10. Said intermediate member is in turn clamped rigidly to the swivel table of a grinding machine (not shown). A spindle housing 15 forms an integral part of said headstock base. A spindle 16 having a flange 17 at the face plate end is supported in ball bearings 18 in said housing. The flanged end of said spindle has a tapered bore to receive a center 19. The spindle bearings 18 consist of two sets of two bearings each. A sleeve 20 internally bevelled at each end is secured in said housing by a screw 21 and engages the outer races of the two inner bearings and determines the spacing of the bearings in housing 15. Said sleeve also serves as a part of the means for preloading the bearings 18. The rest of the preloading means includes a shoulder 22 on flange 17 and a nut 23 at the rear of said spindle. Said shoulder and said nut engage the inner races of the outer bearings the load being applied by means of said nut. A ring 24 for sealing the rear bearings is held in position in the spindle housing by a set screw 25. A cup shaped ring 26 fits over the front end bearing and serves to retain lubricant therein.

A face plate 30 is secured to a pulley 31. Said pulley is mounted on ball bearings 32 which in turn are supported on the outside of housing 15 in substantially the same axial position as the spindle bearings. This bearing arrangement of the spindle bearings inside the housing and the pulley bearings outside the housing and in substantially the same axial position permits the use of a shorter spindle and reduces the overhang of the spindle at the front end thereof. It also makes the two sets of bearings independent of each other. Bearings 32 are held in position in pulley 31 by a shoulder 50 on face plate 30 and by a ring 51 secured to the housing 15 by screws 52. A ring seal 53 seals the space between the periphery of the spindle flange and the face plate. Pulley 31 is driven by a motor 55 thru motor pulley 56 and belts 57. A fixed portion 58 of cover 41 serves as a belt guard. The movable portion of said cover is secured to the base 11 by hinge 59. The means for driving the face plate is not necessarily limited to a pulley mechanism. Gears, chain drives or other well known drive mechanisms may be used to perform the same function with varying degrees of efficiency, and are to be considered the equivalent of that shown in the drawings.

For dead spindle grinding a plunger 35 is urged by spring 36 into engagement with spindle 16. A knob 37 may be used to withdraw said plunger and a pin 38 will hold it in withdrawn position. Rotation of said spindle positions a hole 35' therein to receive said plunger and prevent further rotation of the spindle. When said spindle is thus locked another hole 39 in the periphery of the flange 17 is aligned with a hole 40 in cover 41. A latch 42 having a threaded portion 43 is mounted radially in face plate 30. By rotating said face plate until said latch may be seen thru hole 40, said latch may be positioned relative to hole 39 without delay. A wrench or screw driver may then be inserted thru said hole to drive said latch into hole 39 in preparation for live spindle operation with a chuck 44 bolted to said spindle flange.

We claim:

1. In a headstock for a machine tool comprising a spindle, a spindle housing, bearings in said housing for supporting said spindle therein, a face plate, a pulley for driving said face plate, and bearings on the outside of said housing for supporting said pulley.

2. In a headstock for a machine tool, a spindle, a spindle housing, bearings for rotatably supporting said spindle in said housing, means for holding said spindle against rotation including a plunger in said housing, a hole in said spindle, a flange at the front end of said spindle, a face plate, means for locking said face plate and said flange together including a radial hole in said flange, a pin in said face plate for entering said hole, a hole in the cover plate adjacent said face plate, the holes in said spindle and flange being angularly spaced so that when the plunger has dropped into the hole in the spindle the hole in the flange will be in line with the hole in the cover.

3. In a headstock for a machine tool comprising a spindle, a spindle housing, bearings in said housing for supporting said spindle therein, a face plate, a pulley for driving said face plate, and bearings on the outside of said housing for supporting said pulley said spindle bearings and said pulley bearings being in substantially the same axial position.

4. In a headstock for a machine tool comprising a spindle having a flanged portion at one end, a spindle housing, bearings in said housing for supporting said spindle therein, a face plate having an opening therein slightly larger than the flanged portion of said spindle, means for sealing the space between said flange and said opening, a pulley for driving said face plate, and bearings on the outside of said housing for supporting said pulley, said spindle bearings and said pulley bearings being in substantially the same axial position.

MILBURN A. HOLLENGREEN.
CHARLES R. MENTZER.